(12) United States Patent
Hay (10) Patent No.: US 12,207,754 B2
(45) Date of Patent: Jan. 28, 2025

(54) DEVICE AND METHOD FOR FINISH ROASTING AND BREWING COFFEE BEANS

(71) Applicant: Kate Hay, Mount Vernon, NY (US)

(72) Inventor: Ranald Hay, Bexley, OH (US)

(73) Assignee: New Roast Coffee Holdings LLC, Highland Park, NJ (US)

( * ) Notice: Subject to any disclaimer, the term of this patent is extended or adjusted under 35 U.S.C. 154(b) by 1001 days.

(21) Appl. No.: 17/054,425

(22) PCT Filed: May 8, 2019

(86) PCT No.: PCT/US2019/031396
§ 371 (c)(1),
(2) Date: Nov. 10, 2020

(87) PCT Pub. No.: WO2019/217602
PCT Pub. Date: Nov. 14, 2019

(65) Prior Publication Data
US 2021/0076867 A1    Mar. 18, 2021

Related U.S. Application Data

(60) Provisional application No. 62/669,672, filed on May 10, 2018.

(51) Int. Cl.
*A47J 31/42* (2006.01)
*A47J 31/06* (2006.01)
(Continued)

(52) U.S. Cl.
CPC .......... *A47J 31/42* (2013.01); *A47J 31/0668* (2013.01); *A47J 31/3676* (2013.01); *A47J 31/468* (2018.08); *A47J 31/52* (2013.01)

(58) Field of Classification Search
CPC .. A47J 31/0668; A47J 31/3676; A47J 31/468; A47J 31/52; A47J 31/10
See application file for complete search history.

(56) References Cited

U.S. PATENT DOCUMENTS 2,325,684 A    8/1943  Kayden
4,226,175 A   10/1980  Sandor
(Continued)

FOREIGN PATENT DOCUMENTS

GB    2505659 A   *  3/2014  ............. A47J 31/36
RU    2542227 C2  *  2/2015  ............. A47J 31/002
(Continued)

OTHER PUBLICATIONS

Text version of WO 2017089810 A2 performed on Oct. 5, 2023, Malkin et al. (Year: 2017).*
(Continued)

*Primary Examiner* — Dana Ross
*Assistant Examiner* — Kevin Guanhua Wen
(74) *Attorney, Agent, or Firm* — UB Greensfelder LLP; Matthew J. Schonauer (57) ABSTRACT

Exemplary embodiments herein provide a device for finish roasting and brewing primary roasted and ground coffee beans. Preferably a pod handle assembly contains the primary roasted and ground coffee beans and removably connects with a roaster brewer assembly which performs both a roasting phase of hot air followed by a brewing phase of hot water and/or steam. A user selection dial (or other input) allows a user to select a desired roast level, preferably from very light to very dark. The pod handle assembly can be filled manually by the user, or pre-filled pods which already contain the primary roasted and ground beans may be used. Airflow from a fan should preferably be directed through a heating assembly before contacting the ground coffee beans and exiting through an aperture at the bottom of the pod handle assembly.

18 Claims, 8 Drawing Sheets

(51) Int. Cl.
*A47J 31/36* (2006.01)
*A47J 31/46* (2006.01)
*A47J 31/52* (2006.01)

(56) References Cited

U.S. PATENT DOCUMENTS

| | | |
|---|---|---|
| 9,392,807 B2 | 7/2016 | Hay |
| 9,795,243 B2 * | 10/2017 | Rivera .................... B65B 29/02 |
| 9,936,835 B2 * | 4/2018 | Alshammary ......... A23N 12/08 |
| 2016/0176625 A1 * | 6/2016 | Brockman et al. .. B65D 85/804 |
| 2017/0339973 A1 | 11/2017 | Shi et al. |

FOREIGN PATENT DOCUMENTS

| | | | |
|---|---|---|---|
| WO | WO 2015101490 A2 * | 7/2015 | .............. A47J 31/06 |
| WO | WO2017/089810 | 6/2017 | |
| WO | WO 2017089810 A2 * | 6/2017 | .............. A47J 31/06 |

OTHER PUBLICATIONS

Machine translation of RU 2542227 C2 performed on Jun. 6, 2024, Ioakim et al. (Year: 2015).*
International Search Report for International Application No. PCT/US2019/031396, mailed on Nov. 6, 2019 from USPTO as the ISA.

* cited by examiner

DEVICE AND METHOD FOR FINISH ROASTING AND BREWING COFFEE BEANS

CROSS-REFERENCE TO RELATED APPLICATIONS

This application claims priority to and is a national stage filing of co-pending PCT Application No. PCT/US19/31396 filed on May 8, 2019, which claims priority to U.S. Provisional Application No. 62/669,672 filed on May 10, 2018, where both applications are herein incorporated by reference in their entirety.

TECHNICAL FIELD

Embodiments generally relate to devices and methods for roasting and brewing coffee.

BACKGROUND OF THE ART

Throughout coffee's history roasting has invariably been treated as a single continuous process: green beans are roasted until completion of desired level, typically near 450° F. Depending upon the bean and the desired level of roast, the full roasting process typically takes anywhere from approximately 11 minutes to 14 minutes. Traditionally only completely roasted beans are ground for brewing preparation.

SUMMARY OF THE EXEMPLARY EMBODIMENTS

Recently the concept of primary roasted beans has been invented and described in U.S. application Ser. No. 13/681,023 filed on Nov. 19, 2012 which is now U.S. Pat. No. 9,392,807, all of which is herein incorporated by reference in its entirety. In this disclosure, it is taught that primary roasted beans (beans which have not been roasted to completion) can be pre-roasted, so that the user can complete the final portion of the roasting process on-site immediately prior to brewing their coffee. Using this method, the user would be supplied with primary roasted beans (preferably already ground but not necessarily) that would require a finish roasting process before they could be brewed.

The exemplary device shown and described herein, provides the user with a convenient and efficient way to finish roast their primary roast beans and immediately brew coffee from these freshly-roasted beans.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

NUMERAL CALLOUT LISTING

Figure 1:
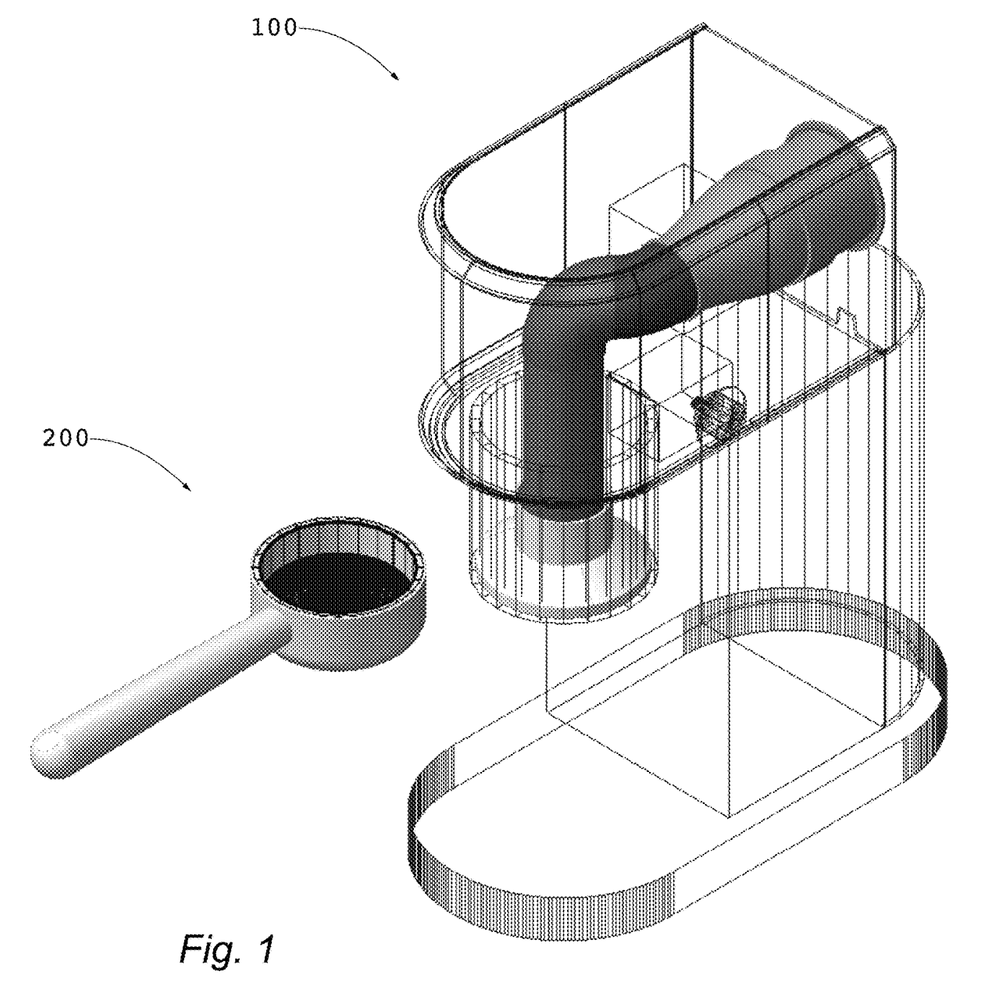
FIG. 1 is a perspective illustration of an exemplary roaster brewer main assembly along with the separate pod handle assembly, prior to being inserted into the main assembly.

100 roaster brewer main assembly
102 base
104 brew heater & pump assembly
105 water delivery tube 106 water storage tank
108 roaster assembly
110 air fan/compressor
115 air connector duct
120 heater assembly
130 oven
140 air pressure controls
150 heater controls
151 start button
152 user selection dial
154 CPU
160 latch body
180 decorative cap
200 pod handle assembly
210 pod assembly
212 upper screen assembly
214 upper screen
216 pod body assembly—reusable or single-use
218 lower screen
220 primary roast pre-ground product
250 pod handle frame
252 handle latching body
254 pod handle
256 vapor duct at base of handle latching body
410 roast pod carrier
412 roast pod with primary roast pre-ground product
414 upper screen of roast pod
415 lower screen of roast pod
416 roast pod carrier chassis
418 roast pod carrier flange
500 path of air flow
520 central axis of heater 120+oven 130+pod body assembly 216
530 thermocouple sensor or optical thermosensor
600 coffee vessel FIG. 1 is a perspective illustration of an exemplary roaster brewer main assembly 100 along with the separate pod handle assembly 200, prior to being inserted into the main assembly 100. The outer housing of the roaster brewer main assembly 100 has been shown as transparent in order to illustrate the internal components. The pod handle assembly 200 would ideally be packed with ground primary roasted beans prior to inserting the handle assembly 200 into the roaster brewer 100.

Figure 2:
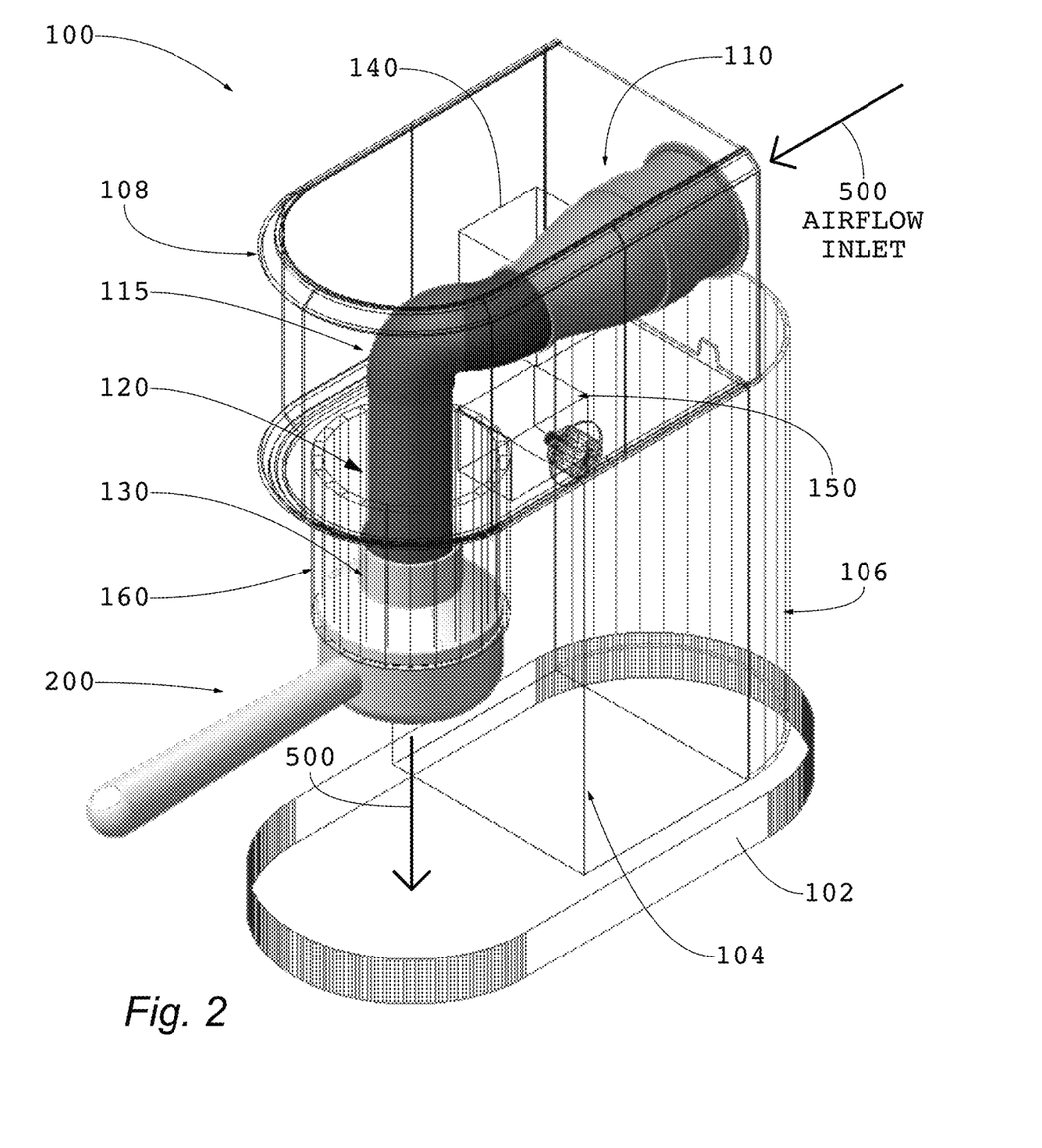
FIG. 2 is a perspective illustration of an exemplary roaster brewer main assembly showing the separate pod handle assembly installed into the main assembly.

FIG. 2 is a perspective illustration of an exemplary roaster brewer main assembly 100 showing the separate pod handle assembly 200 installed into the main assembly 100. An exemplary embodiment would sit atop a base 102 which extends upwardly to create the bottom housing for the brewing heater and pump assembly 104 which contain a heating element for heating the water for brewing as well as a pump assembly for pushing the heated water into an interior portion of the oven 130 once (or slightly before) the final roasting process is complete. A water storage tank 106 is placed in fluid communication with the pump and may be enclosed within the bottom housing for the brewing heater and pump assembly 104 or could be located outside of this bottom housing.

The top housing which contains the roaster assembly 108 generally extends above the bottom housing and contains the brewing heater and pump assembly 104. An air fan or compressor 110 is generally positioned within the top housing so as to draw ambient air into the top housing and through an air connector duct 115 which directs the air into an air heater assembly 120. Preferably, the air heater assembly 120 is oriented vertically but this is not required. Once passing through the air heater assembly 120, the air is directed into an oven 130 where it preferably contacts the primary roasted beans to complete the roasting process prior to brewing. The fan 110, air connector duct 115, air heater assembly 120, and oven 130 are preferably in sealed gaseous communication with each other. The air heater assembly 120 and oven 130 may contain an outer layer of thermal insulation for efficiency and to avoid damage to other components by high temperatures inside the housing.

In this embodiment, the air pressure controls 140 are located adjacent to and in electrical communication with the air fan or compressor 110. Similarly, in this embodiment the heater controls 150 are located adjacent to and in electrical communication with the air heater assembly 120. However, in alternative embodiments, all of the controls may be combined into a single control element (ex. PCB) which is in electrical communication with both the fan 110 and the air heater assembly 120. There are many ways to orient and place the controls and achieve the exemplary device herein, as recognized by those of ordinary skill in the art.

The pod handle assembly 200 may removably connect to the latch body 160 which contains a lower portion for removably attaching the pod handle assembly 200 to the oven 130. Threads, partial threads, notches, or similar may be used so that the pod handle assembly 200 will engage with the bottom of the oven 130 as it is rotated relative to the oven 130 about a vertical axis that is general aligned with the vertical axis 520 of the oven 130 and sometimes air heater assembly 120 as well. As shown herein, an exemplary oven 130 would be substantially symmetrical about a central vertical axis 520 (see FIGS. 5 and 6 for the precise location of central axis 520).

In this particular embodiment, a smaller diameter air connector duct 115 flares out to a larger diameter prior to contacting the heated air with the primary roasted beans. The increase in diameter can occur any time after the air heater assembly 120 and prior to the location of the primary roasted beans within the pod assembly 210. In this embodiment, the oven 130 contains an upper portion which connects to the air heater assembly 120 and has a first diameter, which then transitions to a lower portion having a second diameter that is larger than the first, and is approximately equal to the diameter of the pod assembly 210. In alternative embodiments, the oven 130 would have a diameter substantially equal to the duct 115, such that a transition portion of smaller to larger diameter is not necessary.

Figure 3:
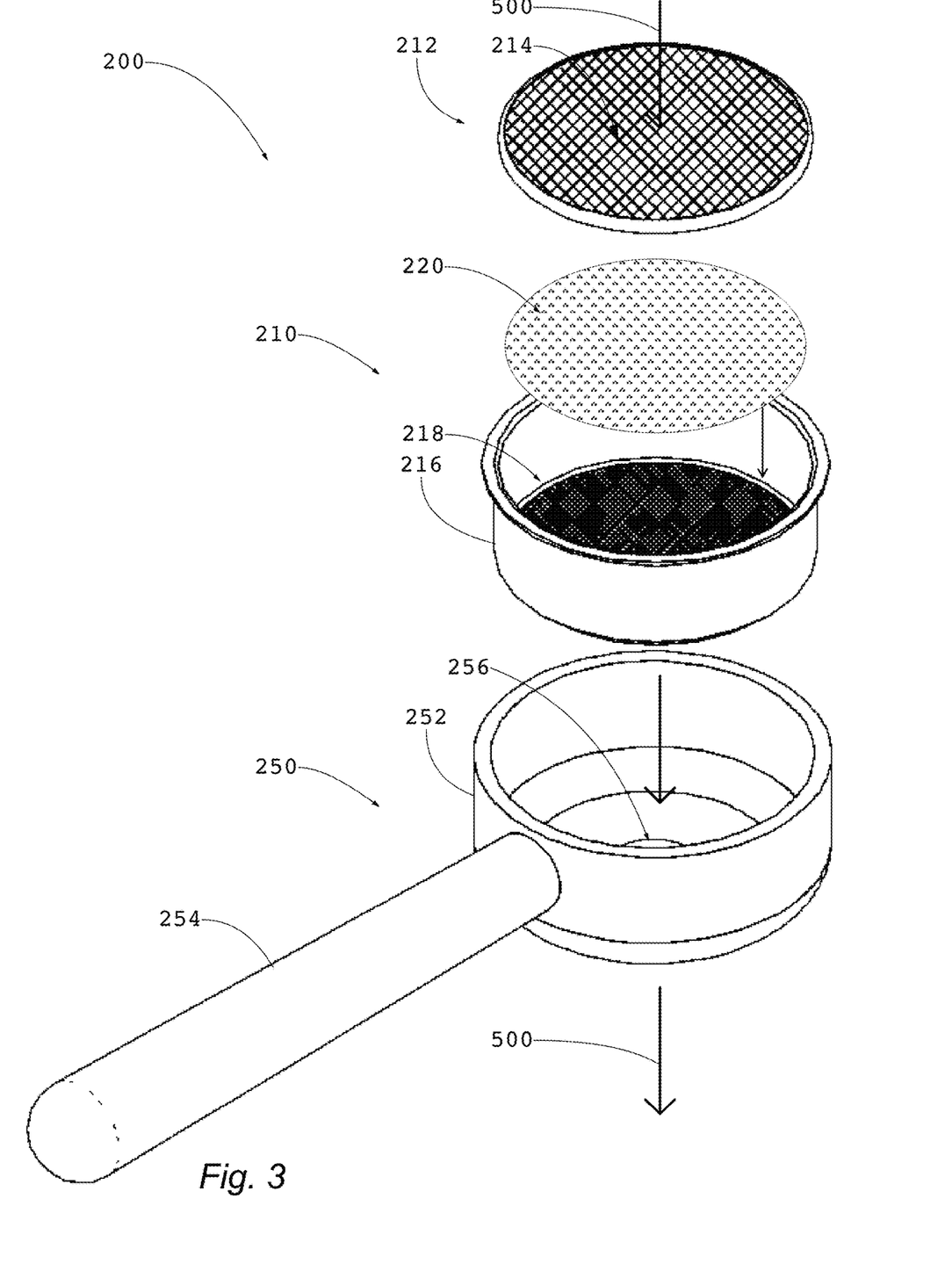
FIG. 3 is an exploded perspective view of an exemplary pod handle assembly.

FIG. 3 is an exploded perspective view of an exemplary pod handle assembly 200. The handle latching body 252 is attached to the end of the pod handle 254 and preferably contains the vapor duct 256 at the bottom of the body 252 and near the centerline. The pod body assembly 216 preferably sits inside the wall of the handle latching body 252 and contains a lower screen 218 for supporting the primary roasted and ground beans 220. In an exemplary embodiment, an upper screen 214 is placed atop the primary roasted grounds 220 and contains an outer annular edge 212 that surrounds the circumference of the circular upper screen 214 and fits within the interior wall of the pod body assembly 216.

In exemplary use, primary roasted grounds 220 would be placed atop the lower screen 218 in a substantially uniform thickness. The upper screen 214 is then placed within the pod body assembly 216, sandwiching the primary roasted grounds 220 between the upper screen 214 and lower screen 218. At this point the pod handle assembly 200 can be installed into the main assembly 100 by attaching the pod handle body 252 to the latch body 160 which connects the bottom opening of the oven 130 to the top opening of handle latching body 252, thus exposing the top screen 214 to the hot air exiting the bottom portion of the oven 130.

Figures 4A, 4B:
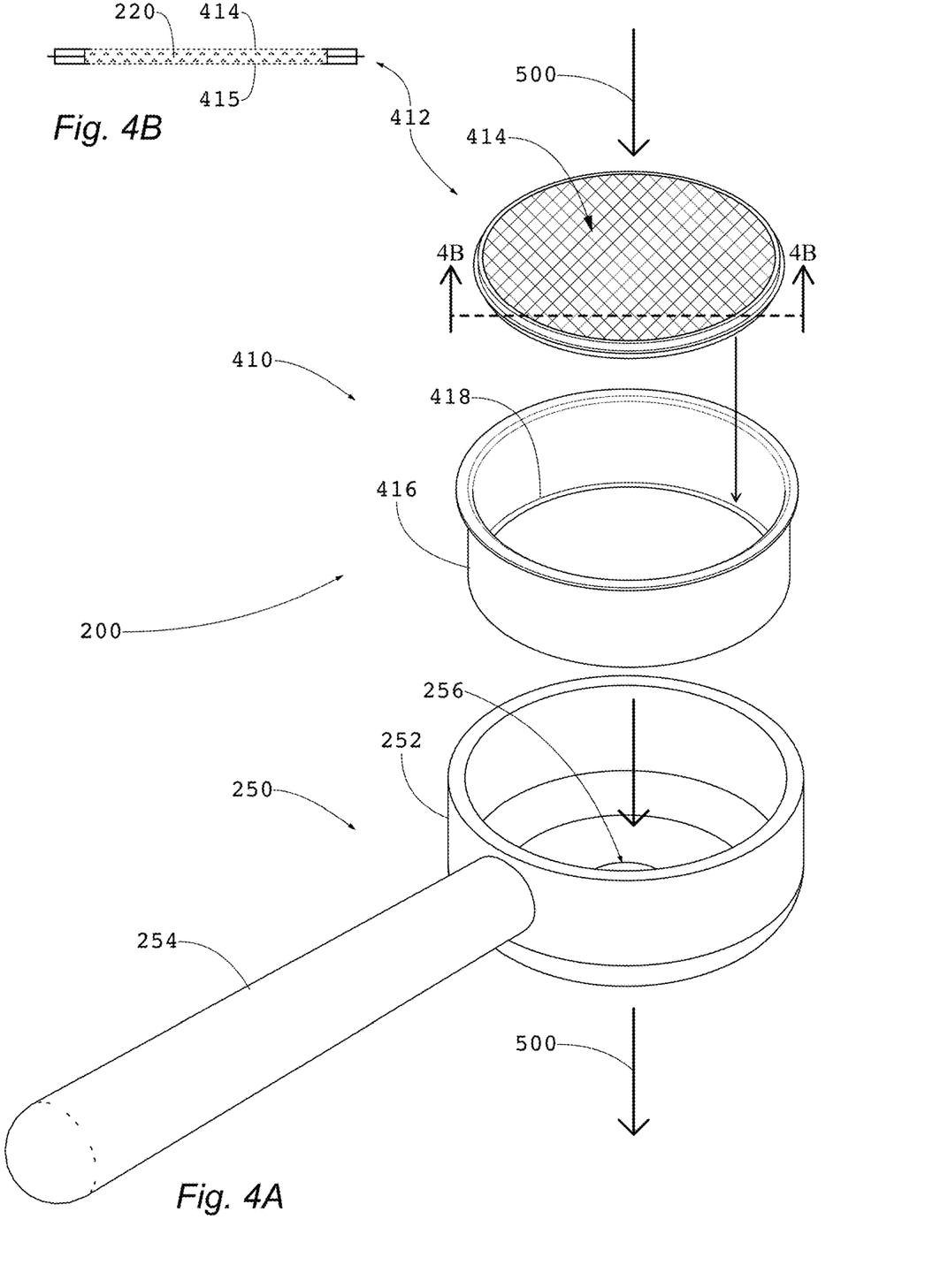
FIG. 4A is an exploded perspective view of another exemplary pod handle assembly which accepts a roast pod that may be pre-filled with primary roasted beans prior to purchase by the consumer.
FIG. 4B is a section view taken along the section line 4B-4B shown in FIG. 4, passing vertically through the pod.

FIG. 4A is an exploded perspective view of an exemplary pod handle assembly 200 which accepts a roast pod that is pre-filled with primary roasted and ground beans prior to purchase by the consumer. In this embodiment, a roast pod 412 contains a upper screen 414 and a lower screen 415 with a substantially uniform layer of primary roasted grounds 220 sandwiched in between the two screens. The roast pod 412 may be purchased as a fully-assembled unit with primary roasted grounds 220 already placed between the screens, or could be assembled by the user at home with re-usable or one-time use upper and lower screens 414/415. Thus, while the embodiment above used a bottom screen 218 that was permanently fixed within the pod body assembly 216, the embodiment shown here can utilize one-time use screens or screens that can be easily changed in/out when desired by the user. FIG. 4B is a section view taken along the section line 4B-4B shown in FIG. 4, passing vertically through the pod 412.

In this embodiment, a roast pod carrier 410 may be used which is very similar to the pod body assembly 216 above, except there is no permanent lower screen 218. Instead, the roast pod carrier 410 simply contains a roast pod carrier chassis 416 having a carrier flange 418 (which can be a continuous element or discreet elements) placed around the interior circumference of the roast pod chassis 416 to support the roast pod 412. During use, the user can simply insert a one-time use pre-filled roast pod 412 into the roast pod chassis 416 and then attach the pod handle assembly 200 into the main assembly 100 to begin the roasting/brewing process.

Alternatively, the user can assemble the roast pod 412 and fill the pod with primary roasted grounds 220 themselves, prior to inserting the roast pod 412 into the roast pod chassis 416 and then attaching the pod handle assembly 200 into the main assembly 100 to begin the roasting/brewing process. Here the screens used in the roast pod 412 may be re-usable for multiple roasting/brewing cycles.

Figure 5:
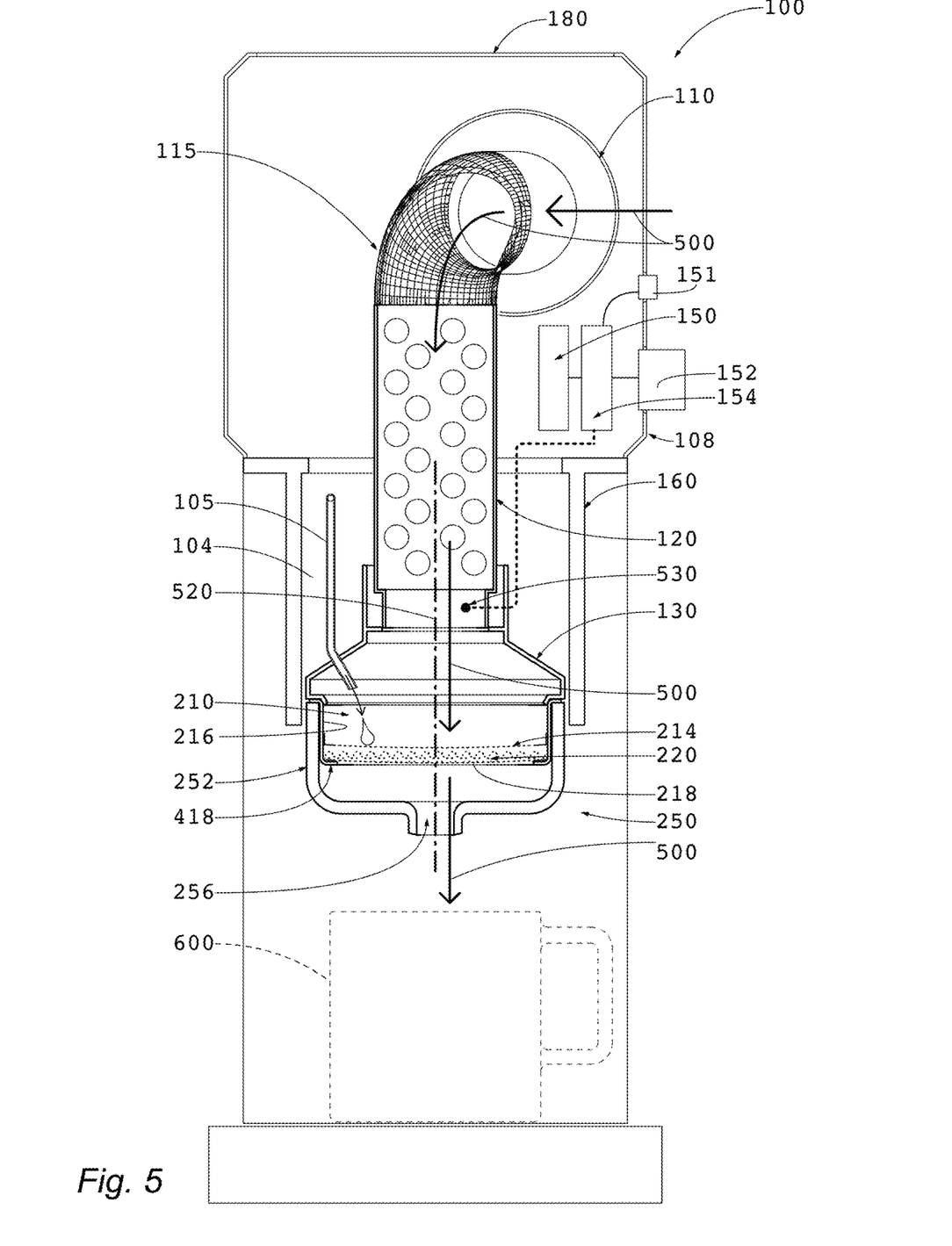
FIG. 5 is a section view showing a section taken through the oven while a pod handle assembly is going through a roast/brew cycle.

FIG. 5 is a section view showing a section taken through the oven 130 while a pod handle assembly 200 with a reusable top screen 214 and bottom screen 218 are going through a roast/brew cycle. As mentioned above, generally the heater assembly 120, oven 130, and handle latching body 252 are substantially symmetrical about a central vertical axis 520. The airflow path 500 begins as the outside air is ingested into the housing and through the air connector duct 115. Once inside the heater assembly 120, the air rises in temperature to approximately 280° F.-500° F., depending on the application. A thermocouple or optical thermal sensor 530 may be placed within the heater assembly 120 as a feedback loop to the controls indicating the approximate temperature within the heater assembly 120 and/or oven 130. The optional thermocouple 530 is preferably in electrical connection with the CPU 154 which preferably contains the basic components necessary for executing the control logic described herein, at least a processor, memory, and RAM would be present, as well as other optional components.

As the hot air 500 continues flowing downwardly, it then enters the oven 130 and handle latching body 252, eventually passing through the upper screen 214 and contacting the primary roasted grounds 220. The hot air 500 will preferably contact the primary roasted grounds 220 at a temperature (T) and time (t) that is selected by the software of the device depending on the user's input at the user selection dial 152 (which can rotate, slide, or utilize any other movement to detect the selection of the user) allowing the user to select their desired level of roast. By using only the user selection dial 152, the user can obtain anything from a light city roast all the way to the darkest roast they desire, with as many increments in between that are desired. In some embodiments, only 6-8 discreet roast levels may be available or sometimes even fewer. However, other embodiments may provide hundreds of roast levels between the lightest and darkest roast, just depending on the type of controls used.

Once the grounds 220 have reached the desired level of roast, or alternatively just prior to the grounds 220 reaching their desired level of roast, the heater assembly 120 may turn off so that it no longer produces heat but the airflow 500 may continue. At this point a drip-style brewing process can begin by sending hot water/steam from the water tank 106, through the heater and pump assembly 104, and finally through the water/steam delivery tube 105 and into the handle latching body 252. From here the hot water would preferably fall or "drip" through the fully roasted grounds 220 and collected in the vapor duct 256 in order to fall into a coffee vessel 600. Prior to the start of the brewing process, the vapor duct 256 has directed hot air 500 from the roasting process into the coffee vessel 600, and this airflow 500 can continue as the brew process begins or can continue throughout the entire brew process. The addition of this airflow to the process creates a strong, freshly-roasted aroma infused into each cup of coffee.

Figure 6:
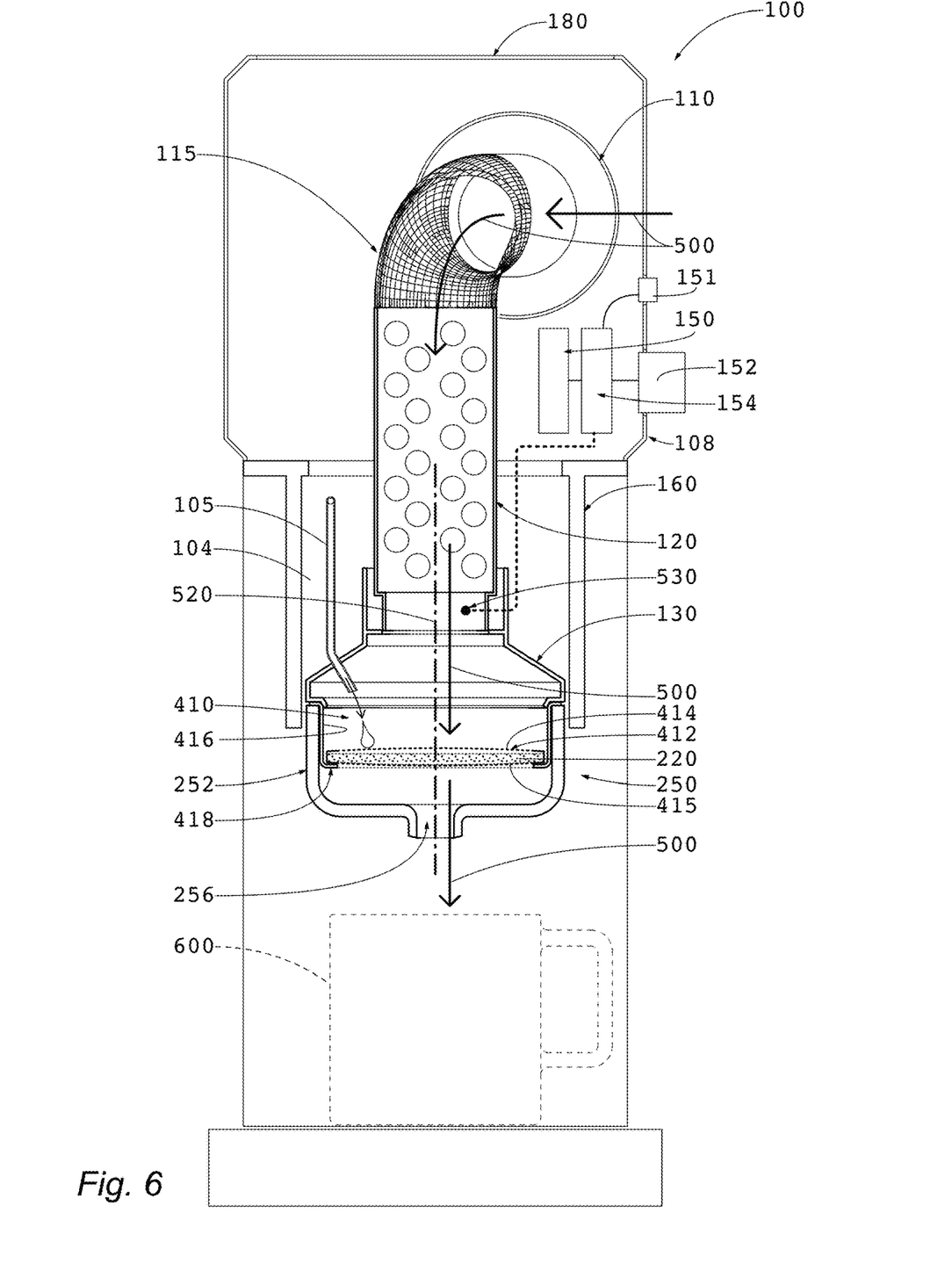
FIG. 6 is a section view showing a section taken through the oven while a pre-filled pod is going through a roast/brew cycle.

FIG. 6 is a section view showing a section taken through the oven while a pre-filled pod 412 is going through a roast/brew cycle. Here the functionality of the device is substantially similar to that described above with re-usable upper 214 and lower screens 218. The notable exceptions would be the process that the user goes through before and after the roast/brew process. First, while the re-usable upper/lower screens 214/218 would have to be filled with primary roast grounds 220 prior to the roast/brew process, in some exemplary embodiments the one-time use pods 412 would be pre-filled with primary roast grounds 220 prior to purchase by the user. Second, while the re-usable upper/lower screens 214/218 would have to be cleaned of used grounds prior to re-filling with new primary roasted grounds 220 for another cup of coffee, in some exemplary embodiments the one-time use pods 412 could simply be thrown away and replaced with a new pre-filled pod 2112 for another cup of coffee. As shown here, the one-time use pod 412 contains an upper screen 414 and lower screen 415 that is pre-filled with primary roasted grounds 220 and sits atop the ledge 418. As shown in FIG. 4B, the pod 412 contains an outer annular ring that connects the upper screen 414 with the lower screen 415.

Figure 7:
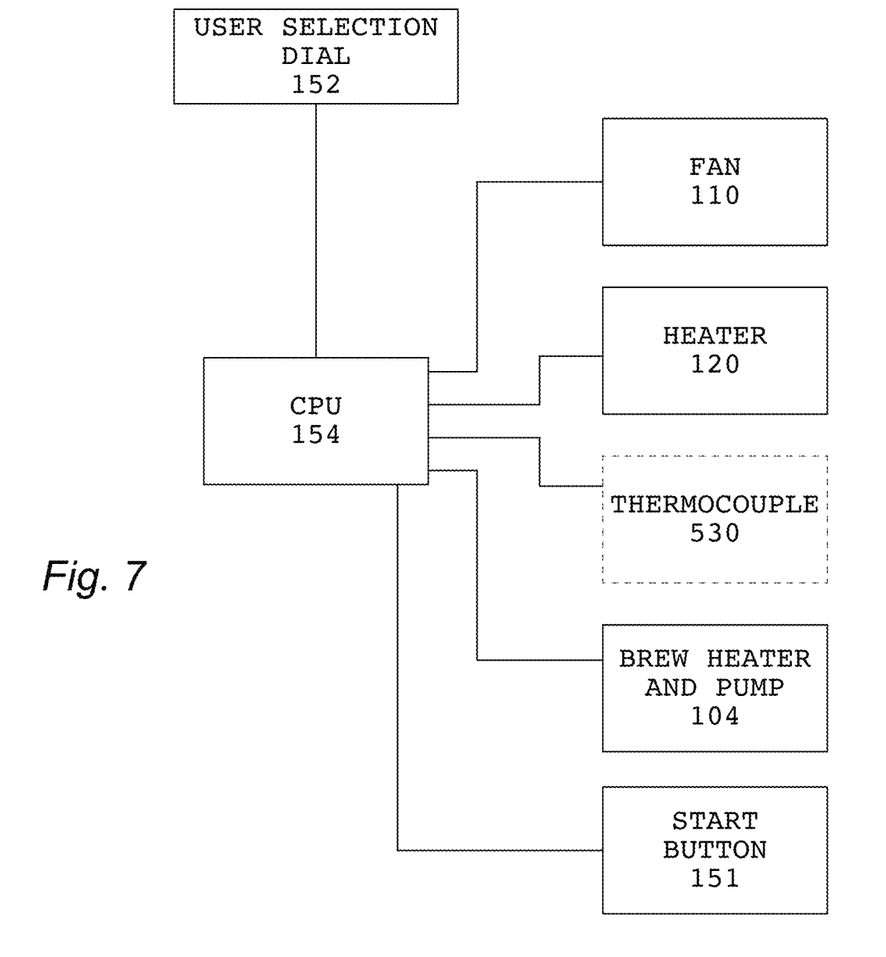
FIG. 7 is a block diagram of the electrical components of an exemplary embodiment.

FIG. 7 is a block diagram of the electrical components of an exemplary embodiment. Here we see the basic components that would be used for an exemplary embodiment including the CPU 154, which is in electrical connection with the user election dial 152, fan 110, heater 120, optional thermocouple 530, brew heater and pump assembly 104, and start button 151. There can of course be other components used, but these would generally be the primary components. Other types of electronics such as power conditioners, transformers, AC/DC converters are not shown here for simplicity but are well-understood by a person having ordinary skill in the art. As noted above, the brew heater and pump assembly 104 may contain several components and may thus have several separate connections with the CPU 154, rather than only one which is shown here again for simplicity.

Figure 8:
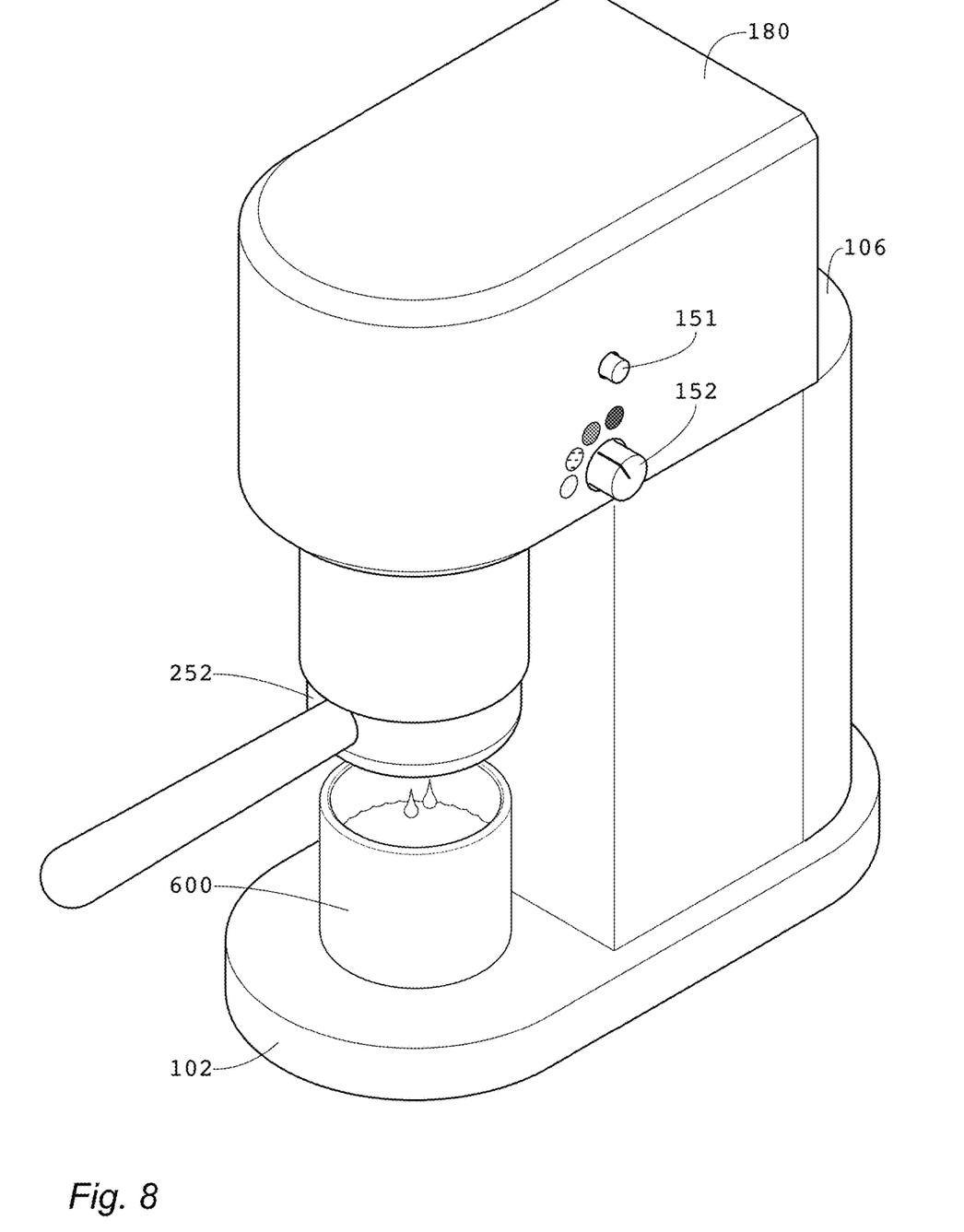
FIG. 8 is a perspective illustration of an exemplary embodiment of the device during use showing the user controls for selecting the desired level of roast.

FIG. 8 is a perspective illustration of an exemplary embodiment of the device during use showing the user controls for selecting the desired level of roast. In this embodiment of the device, the user only needs to perform two basic tasks: (1) selecting the level of roast that the user would prefer on the user selection dial 152 and (2) pressing the start button 151 to begin the roast/brew process. The device will automatically transition from the roast process into the brew process.

In operation, initially the user selects the level of roast that is desired: light-dark and various levels in between. A desired temperature (T) and a desired time (t) are then selected by the CPU 154, depending on this selection. Depending on the temperature (T) that is required, a desired speed (S) of the fan 110 may also be selected. In some embodiments, the fan 110 may be run at the same speed (S) regardless of the temperature (T) that is desired. Generally speaking, the CPU 154 would then direct the air heater assembly 120 to produce desired temperature (T) for desired time (t) while also directing the fan 110 to a desired speed (S) for a desired time (which could be slightly longer than the desired time (t) for the air heater assembly 120 in order to cool the air heater assembly 120). A thermocouple 530 may be positioned near or within the air heater assembly 120 or oven 130 so as to measure the approximate temperature of the air inside the air heater assembly 120 or oven 130. In an exemplary embodiment, this thermocouple 530 would be placed in a feedback loop with the CPU so that it can be used as a thermostat to maintain an accurate temperature within the air heater assembly 120. In some embodiments, the fan 110 may even run at a faster speed (S) at the end of the roasting portion in order to quickly cool the air heater assembly 120.

After the desired level of roasting is complete, the CPU 154 preferably directs the brew heater and pump assembly 104 to pump hot water or steam into the interior of the oven 130 to contact the ground freshly roasted coffee beans in the pod assembly 210. This water (now fresh coffee) will drain through the handle latching body 252 and exit through the bottom aperture in the vapor duct 256 to fall within a coffee vessel 600 of some type. During the roasting process, after contacting the primary roasted beans, the hot air also exits out of this bottom aperture in the vapor duct 256, infusing the coffee with roasting aromas.

As used herein, the term 'gaseous communication' is defined by a communication of any gaseous matter, specifically air, but does not require an air-tight seal or hermetic seal, only substantially free of fluid leaks (or loss of fluid) between the two components.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A device for finish roasting and brewing primary roasted and pre-grounded coffee beans, the device comprising:
   a heater assembly in gaseous communication with an oven;
   a fan in gaseous communication with the heater assembly and oven;
   a latch body surrounding the oven;
   a pod handle assembly which removably connects to the latch body and contains a vapor duct near a bottom portion of the pod handle assembly, where the vapor duct is in gaseous communication with the oven;
   a brew heater and pump assembly arranged to cause hot water to contact the primary roasted and pre-grounded coffee beans and pass through the vapor duct in the pod handle assembly; and
   a perforated upper screen positioned above a lower screen, wherein the perforated upper screen and the lower screen are positioned within a pod body assembly, and wherein the primary roasted and pre-grounded coffee beans are located between the lower screen and the perforated upper screen.

2. The device of claim 1 wherein:
   the fan continues to cause air to pass through the vapor duct while hot water contacts the primary roasted and pre-grounded coffee beans.

3. The device of claim 1 wherein:
   the device operates in a roasting phase followed by a brewing phase.

4. The device of claim 3 wherein:
   the primary roasted and pre-grounded coffee beans remain within the same location during both the roasting phase and the brewing phase.

5. The device of claim 1 further comprising:
   a user selection dial accepting an input of a desired roast level from a user.

6. The device of claim 1 further comprising:
   an annular roast pod carrier flange within a the pod body assembly for accepting pods that are pre-filled with the primary roasted and pre-grounded coffee beans.

7. The device of claim 1 further comprising:
   a user selection dial accepting an input of a desired roast level from a user, and
   a start button which engages the heater assembly for a time (t) and Temperature (T) depending on the desired roast level input received at the user selection dial.

8. The device of claim 7 further comprising:
   a CPU in electrical connection with the fan, heater assembly, and user selection dial which controls the amount of time (t) for the heater assembly to operate depending on the level of roast selected by the user.

9. The device of claim 1 wherein:
   the lower screen, the perforated upper screen, and the oven are arranged vertically along a vertical central axis.

10. A device for finish roasting and brewing primary roasted and pre-grounded coffee beans, the device comprising:
    a pod handle assembly having:
       a pod handle connected to a handle latching body;
       a pod body assembly positioned within the handle latching body;
       a lower screen positioned within the pod body assembly; and
       a perforated upper screen positioned within an interior wall of the pod body assembly and above the lower screen, wherein the primary roasted and pre-grounded coffee beans are placed between the lower screen and the perforated upper screen; and
    a roaster brewer assembly having:
       a fan in gaseous communication with an oven which connects to the handle latching body;

a heater assembly configured to finish roast the primary roasted and pre-grounded coffee beans, wherein the heather assembly is positioned between the fan and the oven; and a water storage tank, heater, and pump operatively connected to a water delivery tube which transfers hot water and steam to the pod body assembly.

11. The device of claim 10 further comprising:

a vapor duct aperture at the bottom of the pod body assembly which allows water to drain out of the pod body assembly.

12. The device of claim 10 wherein:

the primary roasted and pre-grounded beans remain in the same location during both a roasting and a brewing phases.

13. The device of claim 12 wherein:

the primary roasted and pre-grounded beans remain in the same location while contacting hot air and hot water.

14. The device of claim 10 wherein:

the pod body assembly, the perforated upper screen, the lower screen, and the oven are substantially symmetrical about a central vertical axis.

15. A device for finish roasting and brewing primary roasted and pre-grounded coffee beans, the device comprising:

a pod handle assembly having:
    a pod handle connected to a handle latching body;
    a pod body assembly positioned within the handle latching body;
    a lower screen positioned within the pod body assembly;
    a perforated, reusable upper screen positioned within an interior wall of the pod body assembly and above the lower screen to accept the primary roasted and pre-grounded coffee beans between the upper and lower screens; and
    a vapor duct aperture below the lower screen; and a roaster brewer assembly having:
    a fan in gaseous communication with a heater assembly to cause hot air to contact the primary roasted and pre-grounded coffee beans during a roasting phase;
    a water storage tank, heater, and pump operatively connected to a water delivery tube which transfers hot water to the primary roasted and pre-grounded coffee beans during a brewing phase; and
    a latch body which removably connects with the pod body assembly and wherein the hot air also passes through the vapor duct aperture, wherein the use of the primary roasted and pre-grounded coffee beans reduces the time required for full roasting, and provides freshly-roasted pre-grounded coffee beans to be used for immediate brewing.

16. The device of claim 15 wherein:

the lower screen, the perforated, reusable upper screen, and the heater assembly are arranged vertically along a vertical central axis.

17. The device of claim 16 wherein:

the lower screen, the perforated, reusable upper screen, and the heater assembly are substantially symmetrical about the vertical central axis.

18. The device of claim 15 further comprising:

an annular roast pod carrier flange within the pod body assembly for accepting pods that are pre-filled with the primary roasted and pre-grounded coffee beans.

* * * * *